(12) United States Patent
Harada (10) Patent No.: US 7,170,281 B2
(45) Date of Patent: Jan. 30, 2007

(54) ROTATION DETECTING DEVICE (75) Inventor: Yasuhiro Harada, Anjo (JP)

(73) Assignee: Denso Corporation, Kariya (JP)

( * ) Notice: Subject to any disclaimer, the term of this patent is extended or adjusted under 35 U.S.C. 154(b) by 165 days.

(21) Appl. No.: 10/878,437

(22) Filed: Jun. 29, 2004

(65) Prior Publication Data
US 2005/0007098 A1    Jan. 13, 2005

(30) Foreign Application Priority Data
Jul. 8, 2003  (JP) ............................ 2003-271762

(51) Int. Cl.
*G01B 7/30* (2006.01)
*G01P 3/487* (2006.01)
*G01P 3/44* (2006.01)
(52) U.S. Cl. .................... 324/207.25; 324/173
(58) Field of Classification Search ................ 324/174, 324/207.2, 207.21, 207.22, 207.25, 173, 324/178, 179; 384/484, 448; 338/32 H, 338/32 R; 335/205
See application file for complete search history.

(56) References Cited

U.S. PATENT DOCUMENTS 5,642,042 A * 6/1997 Goossens et al. ........... 324/173
6,037,766 A * 3/2000 Goossens et al. ........... 324/173
6,061,895 A * 5/2000 Shinjo et al. ............... 29/602.1
6,155,114 A * 12/2000 Karino et al. ................. 73/493
6,541,958 B2   4/2003 Harada
6,590,776 B2 * 7/2003 Karino et al. ............... 361/728
6,737,863 B2 * 5/2004 Aoki et al. ............. 324/207.25
6,903,545 B2 * 6/2005 Oguro .................... 324/207.22
2003/0001566 A1   1/2003 Tsuge et al.

FOREIGN PATENT DOCUMENTS

JP    A-2000-310647    11/2000

* cited by examiner

*Primary Examiner*—Edward Lefkowitz
*Assistant Examiner*—Kenneth J. Whittington
(74) *Attorney, Agent, or Firm*—Posz Law Group, PLC (57) ABSTRACT

In a rotation detecting device attached to an end face of a hub bearing for an automobile, a sensor body (a resin molded member) having a holder member and a connector member is integrally formed in a single resin molding process. The rotation detecting device shortens the distance between a detection surface of a molded IC and a rotor. The holder member is defined by a recess with a bottom portion and two sidewalls. The molded IC has a detection surface, a back surface opposite to the detection surface, and side surfaces. The molded IC is fixed on the holder member and exposes the detection surface. The back surface of the molded IC is opposed to the bottom portion of the holder member. The side surfaces correspond to portions to be press-fitted, and the sidewalls of the holder member correspond to portions to press-fit.

8 Claims, 5 Drawing Sheets

ROTATION DETECTING DEVICE

CROSS REFERENCE TO RELATED APPLICATION

This application is based upon, claims the benefit of priority of, and incorporates by reference Japanese Patent Application No. 2003-271762 filed Jul. 8, 2003.

BACKGROUND OF THE INVENTION

1. Field of the Invention

The present invention relates to a rotation detecting device that detects the rotation of a detection object on the basis of the rotation of a rotor. The rotation detecting device is suitably used in, for example, a wheel speed sensor.

2. Description of the Related Art

Ordinarily, a molded IC is used in such a rotation detecting device. The molded IC comprises, for example, a sensing element, a signal processing circuit for processing an output signal from the sensing element, and the like. The molded IC is fixed on a sensor body by covering the molded IC with resin.

In the foregoing conventional rotation detecting device, resin molding is carried out in such a manner as to cover the molded IC with resin, to integrally form the sensor body with the molded IC. In this case, a large stress is applied from the resin to an IC chip during resin molding. Thus, when stress is unevenly applied from the resin to the molded IC, and a large stress is applied to a part of the molded IC, there is a possibility that the molded IC may become broken.

Also, from the viewpoint of accuracy in rotation detection, it is preferable that the gap between a detection surface and a rotor, which is called the air gap, is as small as possible. However, since the whole surface of the molded IC is covered with resin, it is impossible to make the air gap shorter (smaller) than the thickness of the covering resin.

SUMMARY OF THE INVENTION

Considering the foregoing problems, an object of the present invention is to provide a rotation detecting device in which a molded IC is prevented from being broken by the stress described above. Another object of the present invention is to provide a rotation detecting device in which the gap between a detection surface of a molded IC and a rotor is short, as compared with a conventional rotation detecting device in which a detection surface of a molded IC is covered with resin.

To achieve the foregoing problems, according to a first aspect of the present invention, a molded IC has a detection surface (13$b$), which is opposed to a detection object to detect the rotation of the detection object. A holder member does not protrude from the detection surface toward the detection object. The holder member fixes the molded IC by a portion (13$d$) different from the detection surface in the state of exposing the detection surface.

The molded IC is fixed on a sensor body with the detection surface exposed, and the holder member does not protrude from the detection surface toward the detection object side. Therefore, as described in the foregoing "Description of the Related Art," it is possible to shorten the distance between the detection surface of the molded IC and the detection object (a rotor), as compared with another rotation detecting device having a structure in which a detection surface of a molded IC is covered with resin.

As a method for fixing the molded IC, according to a second aspect of the present invention, for example, the molded IC is press-fitted into the holder member. Since the molded IC is press-fitted into the holder member of the sensor body by the portion different from the detection surface, as described above, it is unnecessary to fix the molded IC on the holder member by resin molding. Therefore, as described in the foregoing "Description of the Related Art," resin does not impose large stresses on the molded IC during resin molding. At this time, if the holder member is made of elasto-plastic deformation material, it is possible to fix the molded IC with less stress, as opposed to large stress, from resin in resin molding. Therefore, the molded IC is prevented from being broken by large stress from resin in resin molding.

To be more specific, according to a third aspect of the present invention, a back surface of the molded IC is disposed so as to be opposed to a bottom portion of the holder member. The molded IC may be fixed on the holder member, wherein the side surfaces of the molded IC correspond to portions to be press-fitted, and the sidewalls of the holder member correspond to portions to press-fit.

Also according to a fourth aspect of the present invention, the molded IC may be fixed on the holder member, wherein a tapered portion provided in the side surface of the molded IC corresponds to a portion to be press-fitted, and a protruding portion of the holder member corresponds to a portion to press-fit. To fix the molded IC, for example, the molded IC may be pressed into the holder member in a direction perpendicular to the detection surface, or the molded IC may be pressed into the holder member from the side of the holder member in a direction parallel to the detection surface.

According to the fourth aspect of the invention, the molded IC is press-fitted into the holder member by inserting the molded IC into the holder member in a direction parallel to the detection surface. At this time, according to a fifth aspect of the present invention, it is preferable not to provide the protruding portion in the vicinity of an entrance of the holder member, in order to insert the molded IC into the holder member with ease. The length of a part of the holder member without the protruding portion is, for example, from 0.2 to 2 times the width of the molded IC (13) from the entrance for inserting the molded IC.

According to a sixth aspect of the present invention, the sensor body having the holder member and a connector member is integrally formed in a single resin molding process.

In the foregoing rotation detecting device having the structure of a molded IC covered with resin, for example, a sensor body is manufactured as follows. First, a resin molded connector member is connected to the molded IC. Then, the molded IC is secured to the connector member by resin molding, to form the sensor body. Two resin molding processes are necessary in the foregoing rotation detecting device, as described above, and this increases the manufacturing cost.

According to the sixth aspect of the invention, on the other hand, the sensor body is formed in the single resin molding process. The molded IC is press-fitted into the sensor body. Thus, since the sensor body is formed in the single resin molding process, it is possible to reduce the manufacturing cost of the rotation detecting device, as compared with the rotation detecting device with the structure in which its molded IC is covered with resin.

According to a seventh aspect of the present invention, a terminal is fixed inside the sensor body. The terminal is disposed in the sensor body in such a manner that a connection part (14a) of the terminal to be connected to a lead (13a) of the molded IC is connectable to the lead. The terminal is disposed inside the sensor body, which is integrally formed in the single resin molding process, in such a manner that when the molded IC is installed in the sensor body, it is possible to carry out the positioning between the terminal and the lead of the molded IC, by only press-fitting the molded IC into the holder member. Therefore, in connecting the lead to the terminal after the molded IC is fixed on the holder member, it is possible to easily connect the lead to the terminal without using a jig or the like for positioning the molded IC and the terminal.

According to an eighth aspect of the present invention, the sensor body is provided with an anti-short wall (12f), which is disposed between the adjacent terminals, in an area where the terminals are exposed from the sensor body. Therefore, the IC leads are prevented from short-circuiting.

According to a ninth aspect of the present invention, a round-shaped portion of the sensor body opens in an area opposite to the molded IC with respect to a connection part between the lead and the terminal, and in areas adjacent to the connection part in both, right and left, directions. Therefore, when the molded IC is installed in the sensor body, and the lead of the molded IC is connected to the terminal after the molded IC is fixed on the holder member, work space for connection by use of, for example, thermal caulking or the like is secured. This makes it possible to easily connect the lead to the terminal. It is preferable that the width of opening from the connection part between the lead and the terminal is at least twice as long as the width of the terminal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 1:
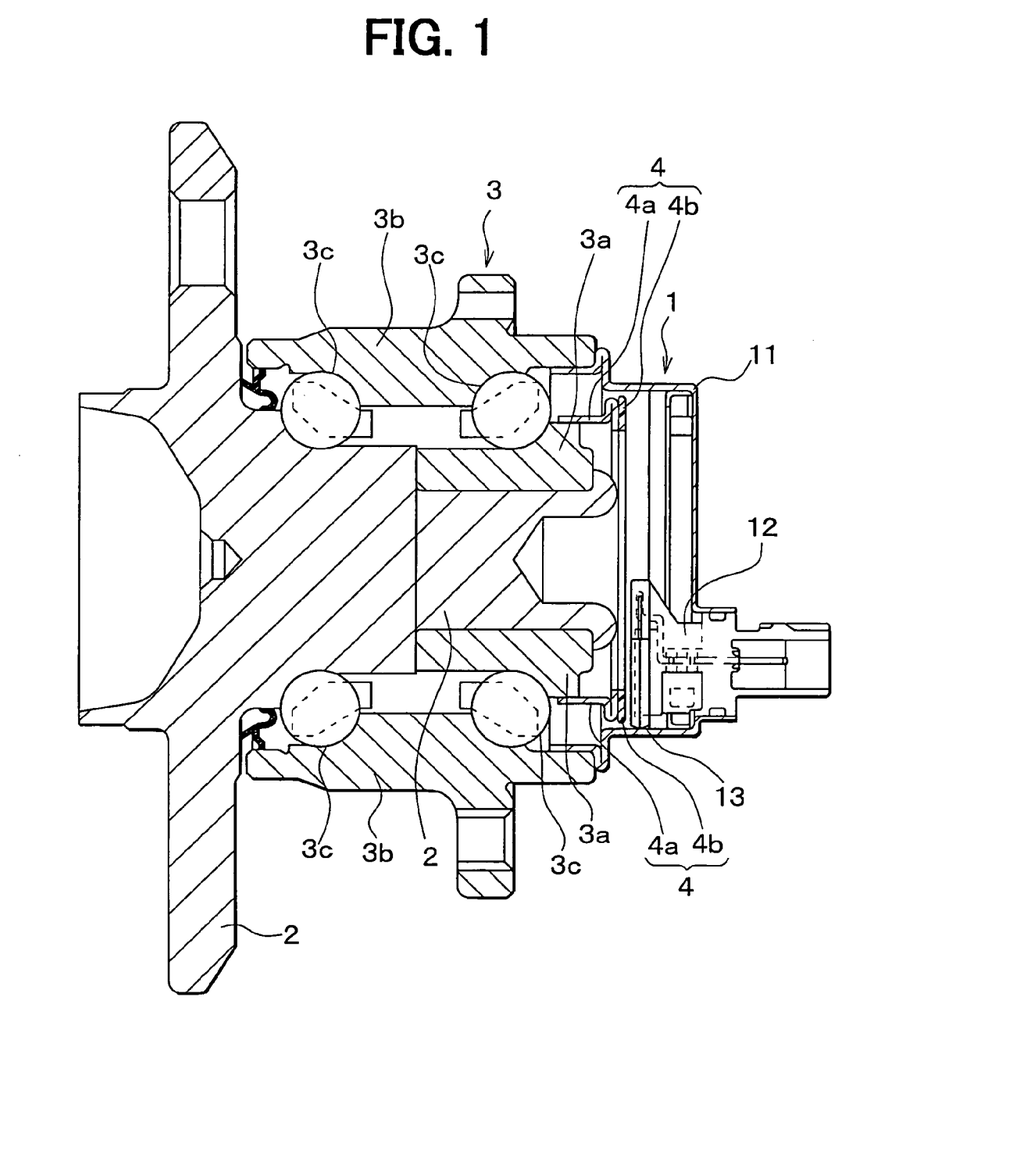
FIG. 1 is a cross-sectional view of a wheel speed sensor attached to a hub unit according to a first embodiment of the present invention.
Figure 2:
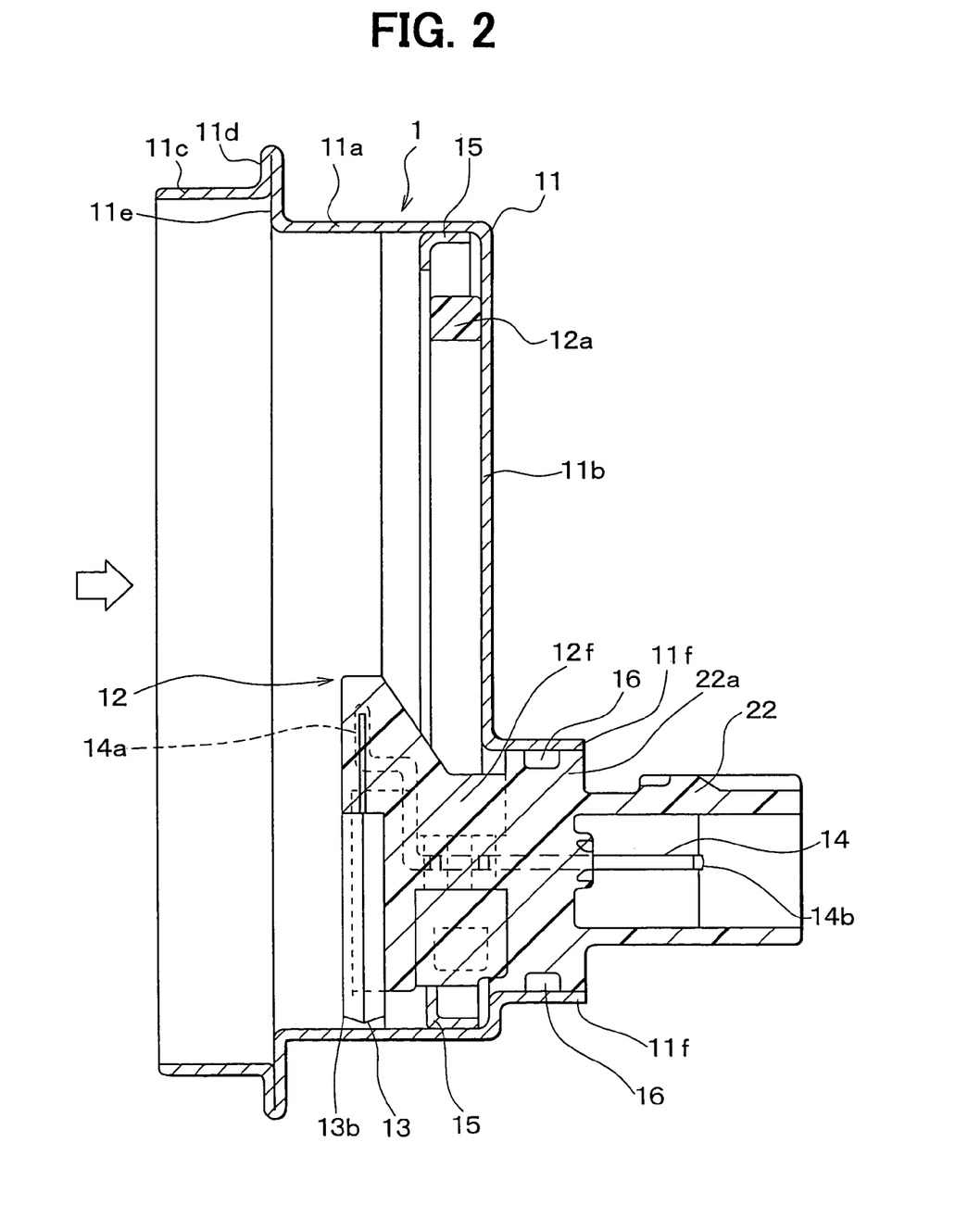
FIG. 2 is an enlarged cross-sectional view of a portion of the wheel speed sensor of FIG. 1, taken along the line II—II of FIG. 3.
Figure 3:
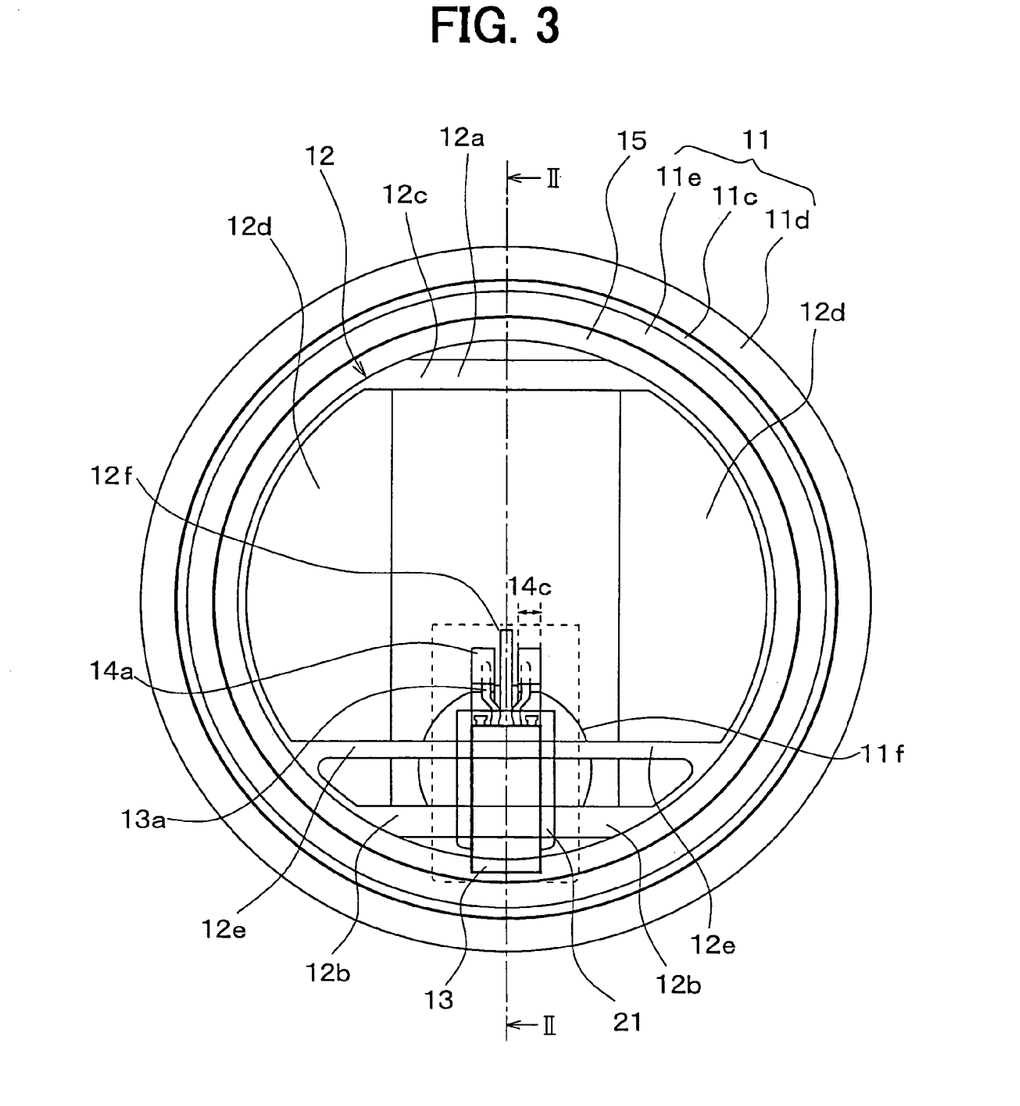
FIG. 3 is a plan view of the wheel speed sensor of FIG. 2, when viewed from the direction of the arrow shown in FIG. 2.

FIG. 1 is a cross-sectional diagram of a wheel speed sensor 1 attached to a car body. The wheel speed sensor 1 corresponds to a rotation detecting device according to an embodiment of the present invention. FIG. 2 is a cross-sectional view of the wheel speed sensor 1 of FIG. 1. FIG. 3 is a plan view of the wheel speed sensor 1 of FIG. 2, viewed from the left side of FIG. 2, that is, the direction of the arrow. FIG. 2 is a cross-sectional view taken along the line II—II in FIG. 3.

The wheel speed sensor 1 according to this embodiment is installed in an idler wheel. To be more specific, the wheel speed sensor 1 is, as shown in FIG. 1, fixed on a hub unit bearing 3, as a cover for an end face of the hub unit bearing 3 attached to a hub shaft 2. The hub unit bearing 3 will be simply called "hub unit 3" in what follows.

The hub unit 3 has a hub inner ring 3a and a hub outer ring 3b the diameters of which are different from each other, and rolling elements (balls) 3c. The hub inner ring 3a, which is secured to the outer periphery of a step provided in the hub shaft 2, rotates together with the hub shaft 2. The hub outer ring 3b is secured to a car body (not shown).

A magnetized rotor 4 is press-fitted on the outer periphery of the hub inner ring 3a. The magnetized rotor 4 rotates in conjunction with the rotation of the hub inner ring 3a. The magnetized rotor 4 has a cylindrical rotor 4a and a ring-shaped multipole magnet 4b secured to the rotor 4a. The multipole magnet 4b is a ring-shaped magnet such as a rubber magnet, a plastic magnet and the like, which is magnetized to alternate the north pole and the south pole in a peripheral direction, that is, about the periphery of the magnet 4b.

The wheel speed sensor 1, as shown in FIGS. 2 and 3, has a cover 11, a resin molded member 12, a molded IC 13, two terminals 14, a metal ring 15, and an O-ring 16. The cover 11 made of metal has a cylindrical side face 11a and a lid-shaped bottom face 11b. The side face 11a is an end portion on the side of the hub shaft 2, and the diameter of the side face 11a is the same as the diameter of the inner periphery of the hub outer ring 3b. The side face 11a has a contact face 11c, and flange-shaped portion 11d and 11e. The contact face 11c comes into contact with the inner periphery of the hub outer ring 3b. The flange-shaped portion 11d and 11e protrudes from the inside to the outside of the cover 11, to make contact with an end face of the hub outer ring 3b. The cover 11 is press-fitted into the hub outer ring 3b, in such a manner that the contact face 11c and the flange-shaped portion 11d come into contact with the hub outer ring 3b. Thus, the wheel speed sensor 1 is structured so as not to rotate together with the hub shaft 2.

An opening made out of a sidewall 11f is formed in the bottom face 11b, in such a manner as to be opposed to the molded IC 13. A connector member 22 of the resin molded member 12 is fitted into the opening.

The resin molded member 12 is disposed to come into contact with the inside of the bottom face 11b of the cover 11. The resin molded member 12, corresponding to a sensor body, has a holder member 21 for holding and fixing the molded IC 13, and a connector member 22 for making the molded IC 13 connect with external electrodes. The resin molded member 12 with the holder member 21, the connector member 22 and the like is integrally molded in a single injection molding process. The resin molded member 12 is made of resin such as, for example, PBT (polybutylene terephthalate) and the like.

Referring to FIG. 3, a part of the resin molded member 12 is hidden behind the metal ring 15 when being viewed from the side of the hub shaft 2. The resin molded member 12 has an approximately ring-shaped outer peripheral portion 12c, and a plate portion 12d disposed inside the outer peripheral portion 12c. The outer peripheral portion 12c has an upper portion 12a and a lower portion 12b, which are parallel to each other, and the other portions of the outer peripheral portion 12c are in the shape of an arc. The surface of the outer peripheral portion 12c and the plate portion 12d parallel to the bottom face 11b of the cover 11 takes the shape of an approximate circle. The outer peripheral portion 12c corresponds to an approximately round or circular-shaped portion.

Referring to FIG. 3, the resin molded member 12 is disposed so that the holder member 21 is positioned on the outside of the center of the resin molded member 12. The holder member 21 is supported by the lower portion 12b of the outer peripheral portion 12c, and a support portion 12e integral with the outer peripheral portion 12c. Since the holder member 21 is disposed in such a position, the molded IC 13 fixed on the holder member 21 is opposed to the magnetized rotor 4, as shown in FIG.

Viewing the resin molded member 12 from the side of the hub shaft 2, as shown in FIG. 3, the plate portion 12d is disposed in the middle of the resin molded member 12, in such a manner as to open the upper sides and the right and left sides of leads 13a of the molded IC 13. To be more specific, an area from the connection part 14a between the terminal 14 and the lead 13a of the molded IC 13 to the upper portion 12a is open. As for a horizontal direction, the plate portion 12d is disposed inside the outer peripheral portion 12c, so that the width of the opening from the connection part 14a of the terminal 14 is three times as wide as the width 14c of the single terminal 14.

Figure 4:
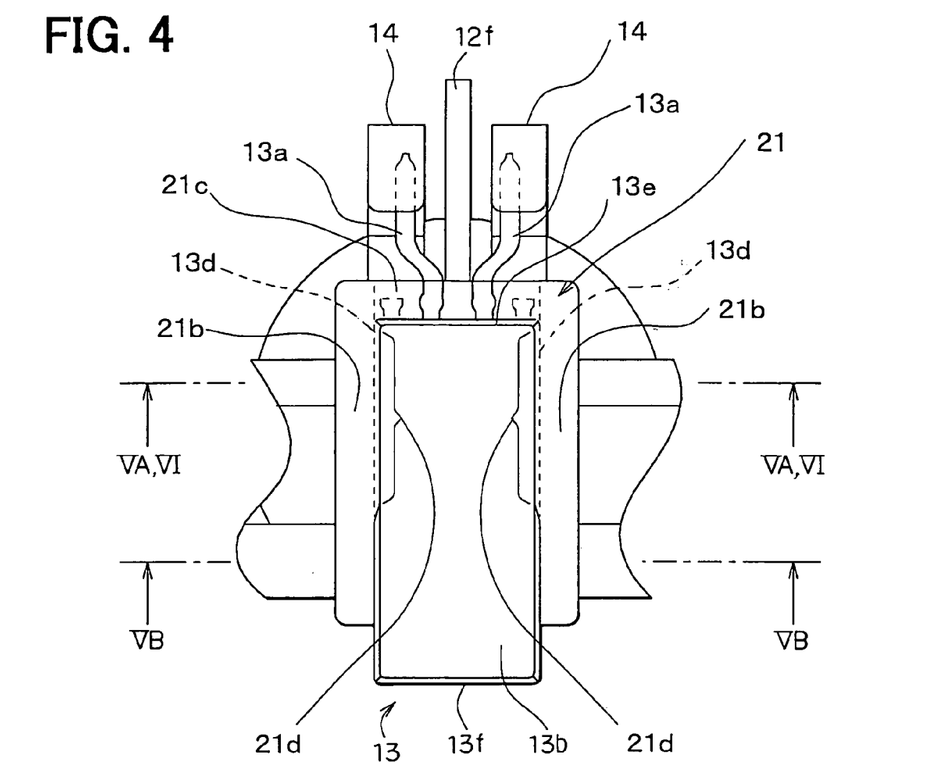
FIG. 4 is an enlarged plan view of an area surrounded by a broken line in FIG. 3 of a holder member holding a molded IC of the wheel speed sensor.
Figure 5A:
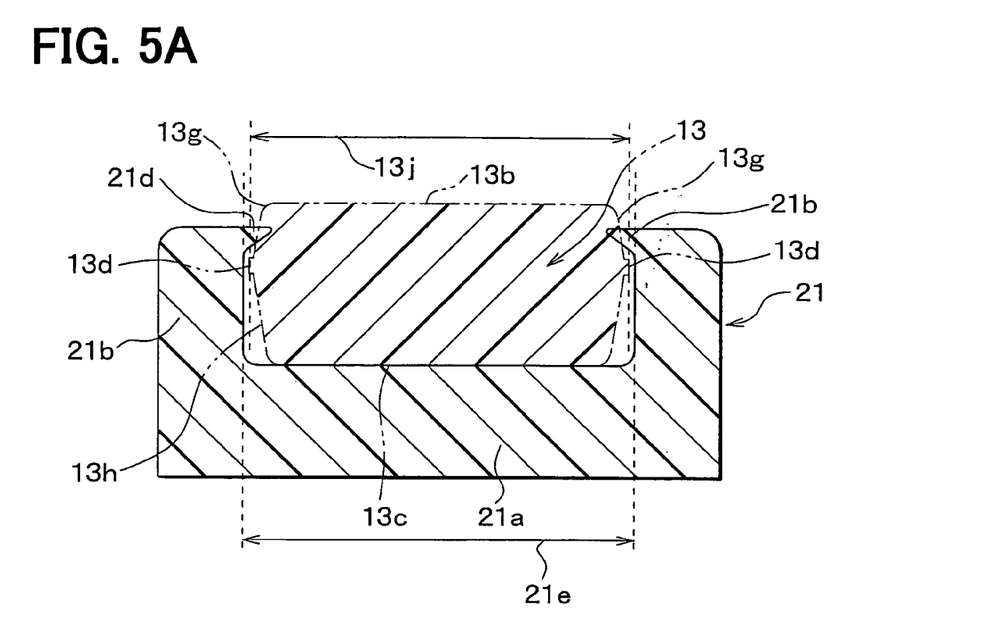
FIG. 5A is a cross-sectional view taken along the line VA—VA in FIG. 4.
Figure 5B:
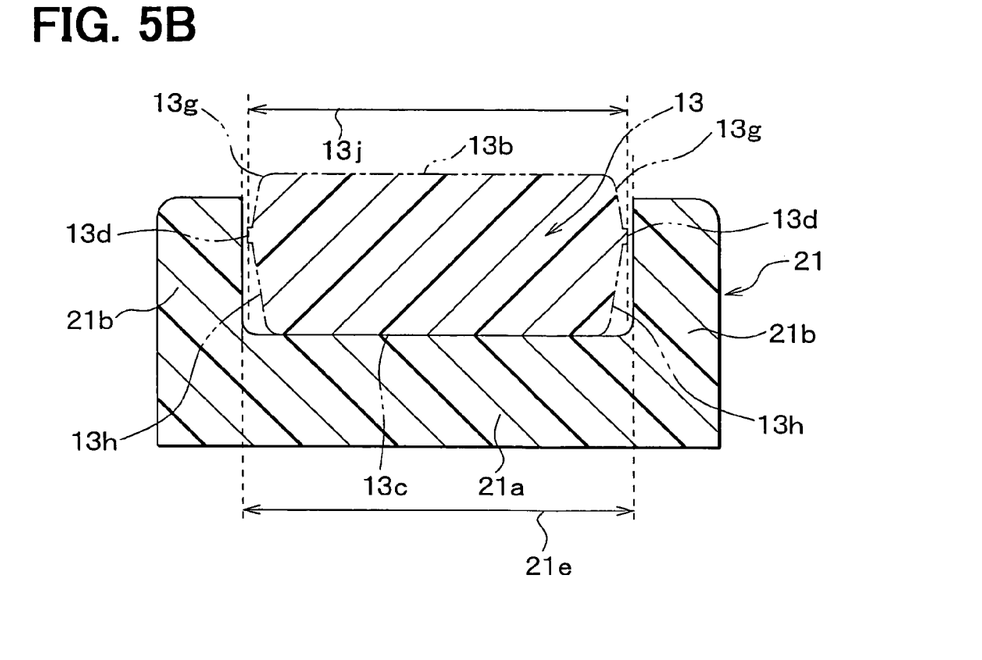
FIG. 5B is a cross-sectional view taken along the line VB—VB in FIG. 4.

FIG. 4 shows an enlarged view of an area surrounded by a broken line in FIG. 3. The area contains the molded IC 13 and the holder member 21. FIGS. 5A and 5B are cross-sectional views taken along the lines VA—VA and VB—VB in FIG. 4, respectively.

Referring to FIG. 4, the holder member 21 takes the shape of a box, without a top face and a side face on the lower side of the drawing. In other words, as shown in FIGS. 5A and 5B, the holder member 21 has a bottom portion 21a, sidewalls 21b positioned on the right and left sides of the bottom portion 21a, and a sidewall 21c positioned upward of the molded IC 13 in FIG. 4. The holder member 21, as shown in FIGS. 5A and 5B, takes the shape with a recess defined by the bottom portion 21a and the sidewalls 21b.

The distance 21e between the sidewalls 21b on both sides of the bottom portion 21a is slightly wider than the width 13j of the molded IC 13. The sidewall 21c positioned upward of the molded IC 13 in FIG. 4 has openings, which are not shown in FIG. 4. The leads 13a of the molded IC 13 extend to the inside of the outer peripheral portion 12c of the resin molded member 12 through these openings. Rib-shaped portions 21d protruding toward the molded IC 13, as shown in FIG. 5A, are formed in the sidewalls 21b. Referring to FIG. 4, the rib-shaped portion 21d is formed in a part of the sidewall 21b, in which a length from the sidewall 21c positioned upward of the molded IC 13 is approximately three-fifths of the length of the sidewall 21b.

The molded IC 13, on the other hand, has a detection surface 13b, a back surface 13c, side surfaces 13d, and surfaces 13e and 13f positioned on the upper and lower ends of the detection surface 13b, respectively, as shown in FIG. 4. The detection surface 13b is frontward on the paper in FIG. 4, and the back surface 13c is opposite to the detection surface 13b. The side surfaces 13d are positioned on both ends of the detection surface 13b. The leads 13a extend upward from the surface 13e positioned on the upper end of the detection surface 13b.

Both of the detection surface 13b and the back surface 13c are flat. The side surface 13d, as shown in FIGS. 5A and 5B, has a tapered portion 13g and an inverted tapered portion 13h. In the tapered portion 13g, the distance between the two side surfaces 13d increases when approaching the back surface 13c from the detection surface 13b. In the inverted tapered portion 13h, contrary to the tapered portion 13g, the distance between the two side surfaces 13d decreases, when approaching the back surface 13c from the detection surface 13b.

The molded IC 13 is disposed so that the back surface 13c is opposed to the bottom portion 21a of the holder member 21, and the side surfaces 13d are opposed to the sidewalls 21b of the holder member 21. As shown in FIG. 3, the leads 13a are positioned in the vicinity of the center of the resin molded member 12. The molded IC 13 is press-fitted into the holder member 21 and exposes the detection surface 13a, wherein the tapered portions 13g of the two side surfaces 13d serve as portions to be press-fitted, and the rib-shaped portions 21d of the holder member 21 serve as portions to press-fit.

The molded IC 13 is fixed on the holder member 21 so that the detection surface 13b is opposed to the magnetized rotor 4. Referring to FIGS. 5A and 5B, the rib-shaped portions 21d of the holder member 21 are positioned on the lower side of the drawings than the detection surface 13b of the molded IC 13. Since the vertical direction in the FIGS. 5A and 5B corresponds to a horizontal direction in FIG. 1, the magnetized rotor 4 is positioned upward of the detection surface 13b in FIGS. 5A and 5B. In other words, the rib-shaped portions 21d do not protrude from the detection surface 13b toward the magnetized rotor 4.

The holder member 21, as described above, does not protrude from the detection surface 13b of the molded IC 13 toward the magnetized rotor 4. Thus, nothing is disposed and only slight space is left between the detection surface 13b of the molded IC 13 and the magnetized rotor 4 in FIG. 1.

The molded IC is composed of an IC chip, a magnet and the like, which are molded with resin together with the leads 13a. The IC chip is provided with an MRE (magneto-resistance effect) element for generating output in accordance with variation in a magnetic field as a sensing element, a signal processing circuit for processing an output signal from the MRE element and the like. The molded IC 13 may be provided with another semiconductor sensor element, instead of the MRE element.

Referring to FIG. 2, the cylindrical connector member 22 is disposed oppositely to the hub shaft 2 across the holder member 21 of the resin molded member 12. The terminals 14 are disposed over the connector member 22 and the holder member 21. One end 14b of the terminal 14 is positioned inside the connector member 22, and the other end 14a thereof is connected to the leads 13a of the molded IC 13. These terminals 14 are fixed inside the resin molded member 12. In the wheel speed sensor 1, since the terminals 14 inside the connector member 22 are connected to an external device, an output signal from the sensor element in the molded IC 13 is received by the external device.

The connector member 22 has a portion 22a the diameter of which is the same as the internal diameter of the opening, which is of the sidewall 11f in the bottom face 11b of the cover 11. This portion 22a is fixed in the sidewall 11f through the O-ring 16. The O-ring 16 shields the space between the connector member 22 and the sidewall 11f.

The terminals 14 are partially exposed from the resin molded member 12, like the connection parts 14a to the leads 13a, on the side of the holder member 21 from the opening formed in the bottom face 11b of the cover 11. A resin wall 12f is disposed between the two terminals 14 exposed from the resin molded member 12. The resin wall 12f serves as an anti-short wall and integrally continues from the resin molded member 12.

The metal ring 15 is disposed inside the cover 11 on the side of the bottom face 11b. The external diameter of the metal ring 15 is approximately the same as the internal diameter of the cover 11 on the side of the bottom face 11b. The metal ring 15 is press-fitted into the bottom of the cover 11 via the resin molded member 12. Thus, the resin molded member 12 is fixed to be held in the cover 11.

The wheel speed sensor 1, attached to the hub unit 3 like this, detects the movement of each magnetic pole in response to the rotation of the magnetized rotor 4 secured to the hub shaft 2, at the detection surface 13a of the molded IC 13 (the surface 13a being opposed to the magnetized rotor 4), in order to detect the rotation of an idler wheel.

Then, a method for assembling this wheel speed sensor 1 itself, and a method for attaching the wheel speed sensor 1 to the hub unit 3 will be hereinafter described. First, the resin molded member 12, which has the outer peripheral portion 12c, the plate portion 12d, the resin wall 12f, the holder member 21, and the connector member 22, is formed by injection molding with the terminals 14 inserted. Since the resin molded member 12 is formed in a single resin molding process like this, every part of the resin molded member 12 is integral and continuous. The terminals 14 are disposed in such positions that when the molded IC 13 is fixed on the resin molded member 12, the ends 14a of the terminals 14 are connectable to the leads 13a of the molded IC 13.

Then, having the molded IC 13 on hand, the molded IC 13 is press-fitted into the holder member 21 of the resin molded member 12. To be more specific, referring to FIG. 4, the molded IC 13 is inserted into the holder member 21 from under the holder member 21, upward in the drawing, in a direction parallel to the detection surface 13b. At this time, the back surface 13c of the molded IC 13 is made to contact the bottom portion 21a of the holder member 21. The molded IC 13 is inserted until the surface 13e with the leads 13a of the molded IC 13 comes into contact with the sidewall 21c of the holder member 21.

In this embodiment, the rib-shaped portions 21d are formed in a part of the sidewall 21b of the holder member 21 shown in FIG. 4. The length of the rib-shaped portions in FIG. 4 is approximately three-fifths of the length of the sidewall 21b. The rib-shaped portions 21d, as shown in FIG. 5A, protrude toward the molded IC 13. In other words, the rib-shaped portion 21d is not provided in a part of the sidewall 21b of the holder member 21, the length of which from an entrance for inserting the molded IC 13 (that is, from the lower side of FIG. 4) is approximately two-fifths of the length of the sidewall 21b, as shown in FIG. 5B. The distance between the sidewalls 21b is wider than the width of the molded IC 13. Thus, it is possible to easily insert the molded IC 13 into the holder member 21.

In this embodiment, the rib-shaped portion 21d is provided in a part of the sidewall 21b of the holder member 21. The rib-shaped portion 21d does not occupy approximately two-fifths of the sidewall 21b, and this two-fifths portion is from the viewpoint of inserting the molded IC 13 into the holder member 21. That is, the two-fifths portion is near the entrance from the viewpoint of inserting the molded IC 13 into the holder member 21. The rib-shaped portion 21d, however, may be provided in the whole sidewall 21b.

From the viewpoint of easily inserting the molded IC 13 into the holder member 21, the length of the part without the rib-shaped portion 21d from the entrance of the sidewall 21b is not limited to approximately two-fifths of the length of the sidewall 21b. The length of the area without the rib-shaped portion 21b may be arbitrarily selected from 0.2 to 2 times the width 13j in a direction connecting the two side surfaces 13d of the molded IC 13.

After the molded IC 13 is press-fitted into the holder member 21, the ends 14a of the terminals 14 are connected to the leads 13a by thermal caulking. At this time, according to this embodiment, when the molded IC 13 is inserted and press-fitted, the ends 14a of the terminals 14 are positioned in the vicinity of the leads 13a. Thus, it is possible to easily connect the leads 13a to the ends 14a of the terminals 14 by thermal caulking or the like, without using a jig for securing the molded IC 13 to the ends 14a of the terminals 14. The connection method is not limited to thermal caulking. Other connection methods such as soldering and the like are also available.

In this embodiment, as shown in FIG. 3, the plate portion 12d is disposed in the middle of the resin molded member 12, so as to open the vicinity of the leads 13a and the ends 14a of the terminals 14. This open area becomes work space for thermal caulking, so that it is possible to easily connect the ends 14a of the terminals 14 to the leads 13a by thermal caulking.

The size of the open area is arbitrary selected, as long as space for connecting the terminals 14 to the leads 13a is secured. Therefore, explaining structure in the middle of the outer peripheral portion 12c with reference to FIG. 3, the plate portion 12d is disposed so as to have an opening inside the outer peripheral portion 12c. The opening opens in the vicinity of the connection parts between the leads 13a of the molded IC 13 and the ends 14a of the terminals 14. The size of the opening in each of the vertical and horizontal directions from the connection parts becomes equal to or more than twice as long as the width of the terminal 14. From the viewpoint of securing the workspace for connection, for example, the plate portion 12d may not be disposed inside the outer peripheral portion 12c, in order to provide a space in the middle of the outer peripheral portion 12c.

Then, the resin molded member 12 is inserted into the cover 11 so as to make contact with the inside of the bottom face 11b of the cover 11. At this time, the resin molded member 12 is positioned so that the connector member 22 of the resin molded member 12 protrudes from the opening, formed in the bottom face 11b of the cover 11, to the outside of the cover 11. Thus, the resin molded member 12 and the cover 11 are positioned to each other. The O-ring 16 is attached between the sidewall 11f for composing the opening and the resin molded member 12.

The metal ring 15 is inserted into the inside of the cover 11, and the resin molded member 12 is press-fitted into the cover 11 in such a manner as to hold down the outer peripheral portion 12c of the resin molded member 12 on the side of the bottom face 11b of the cover 11. Therefore, the resin molded member 12 is fixed in the cover 11, and hence the wheel speed sensor 1 is manufactured in this manner.

Furthermore, the wheel speed sensor 1 is press-fitted into the hub outer ring 3b by fitting the side face 11a of the cover 11 into the hub outer ring 3b. Therefore, as shown in FIG. 1, the wheel speed sensor 1 is attached to the hub unit 3. Since the wheel speed sensor 1 is attached to the hub unit 3 in this manner, the inside of the wheel speed sensor 1 is hermetically sealed. Therefore, it is possible to prevent water from entering the inside of the wheel speed sensor 1.

In the wheel speed sensor 1 according to this embodiment, the molded IC 13 is fixed on the holder member 21 by use of the tapered portions 13g of the side surfaces 13d, which serve as portions to be press-fitted, different from the detection surface 13b and the rib-shaped portions 21d of the holder member 21, which serve as portions to press-fit. The detection surface 13b is exposed outside, without being covered with the resin molded member 12.

Therefore, as described in the foregoing "Description of the Related Art," it is possible to reduce the size of an air gap when the wheel speed sensor 1 is attached to the hub unit 3, as compared with another rotation detecting device having a structure such that a detection surface of a molded IC is covered with resin, or compared with a molded IC that is covered with resin in a second molding.

In the wheel speed sensor 1, the molded IC 13 is press-fitted into the resin molded member 12, by inserting the molded IC 13 into the holder member 21 of the resin molded member 12, which is molded with resin. Thus, according to this wheel speed sensor 1, it is unnecessary to fix the molded IC 13 on a sensor body by resin molding during the manufacture of the wheel speed sensor 1 itself. Therefore, large stresses, which become a problem when fixing the molded IC 13 on the sensor body by resin molding, is not applied from resin to the molded IC 13.

In this embodiment, pressure is applied from the rib-shaped portions 21d of the holder member 21 to the side surfaces 13d of the molded IC 13. The resin molded member 12 including the holder member 21 is, however, made of elasto-plastic deformation material. Thus, when the molded IC is fixed on the sensor body by resin molding, it is possible to fix the molded IC with less stress than the large stresses from resin during resin molding. Therefore, the molded IC 13 is prevented from being broken by the large stresses from resin during resin molding.

In the wheel speed sensor 1 according to this embodiment, the terminals 14 are exposed from the resin molded member 12, on the side of the holder member 21 with respect to the opening in the bottom face 11b of the cover 11. The resin wall 12f is disposed between the two terminals 14 in this area. Therefore, the resin wall 12f prevents the IC leads from short-circuiting.

In manufacturing the sensor body of the wheel speed sensor 1 according to this embodiment, the molded IC 13 is not fixed on the sensor body by resin molding. In other words, the resin molded member 12 is first formed in the single resin molding process, and then the molded IC 13 is press-fitted into the resin molded member 12, to form the sensor body.

In the foregoing rotation detecting device having a structure such that the molded IC is covered with resin, for example, a sensor body is manufactured as follows. First, a resin molded connector member is connected to the molded IC. Then, the molded IC is fixed on the connector member by resin molding to form the sensor body. Two resin molding processes are necessary to form the sensor body of the foregoing rotation detecting device, as described above, so that the manufacturing cost is increased.

According to this embodiment, on the other hand, the sensor body is formed in a single injection molding process, and hence it is possible to reduce the manufacturing cost, as compared with the rotation detecting device with a structure such that its molded IC is covered with resin.

(Other Embodiments)

In the first embodiment, the molded IC 13 is fixed on the holder member 21 by use of the tapered portions 13g in the side surfaces 13d, which are different from the detection surface 13b of the molded IC 13, as the portions to be press-fitted, and the rib-shaped portions 21d of the holder member 21 as the portions to press-fit. The molded IC 13 may be fixed on the holder member 21 as follows.

Figure 6:
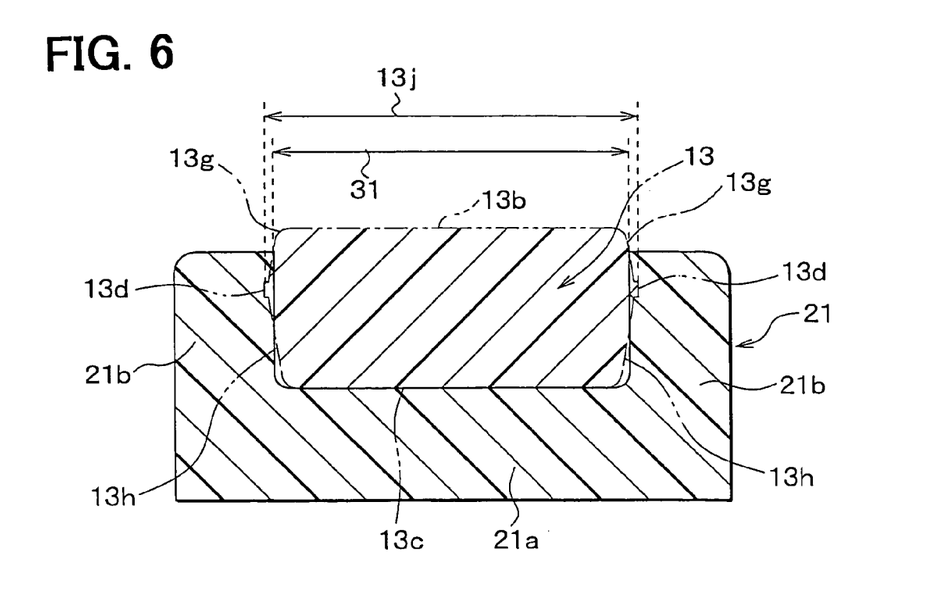
FIG. 6 is a cross-sectional view taken along the line VI—VI in FIG. 4 according to another embodiment.

FIG. 6 shows a cross-sectional view taken along the line VI—VI in FIG. 4. This drawing corresponds to FIG. 5A. Referring to FIG. 6, when the width 13j of the molded IC 13 is made narrower than the distance 31 between sidewalls 21b of the holder member 21, the molded IC 13 is press-fitted into the holder member 21. At this time, side surfaces 13d of the molded IC 13 correspond to portions to be press-fitted, and the sidewalls 21b correspond to portions to press-fit.

Also in this case, as in the case of the first embodiment, it is possible to press-fit the molded IC 13 by inserting the molded IC 13 into the holder member 21 from underneath of the holder member 21 in FIG. 4. The distance between the sidewalls 21b may be narrower than the width of the molded IC 13 in the hole of the holder member 21. Otherwise, as in the case of the first embodiment, the distance between the sidewalls 21b may be slightly wider in the vicinity of the entrance of the holder member 21 for inserting the molded IC 13.

In the first embodiment, the molded IC 13 is pressed from the side of the holder member 21 toward a direction parallel to the detection surface, to fix the molded IC 13 on the holder member 21. The molded IC 13 may be disposed above the holder member 21 in such a manner that the back surface 13c of the molded IC 13 is opposed to the bottom portion 21a of the holder member 21, and the molded IC 13 may be pressed in a direction perpendicular to the detection surface 13b of the molded IC 13. This also applies to the first embodiment.

In the foregoing embodiment, the resin molded member 12 is press-fitted into the cover 11 with the use of the metal ring 15. The resin molded member 12 may be fixed in the cover 11 with the use of another fixation method. The resin molded member 12 may be fixed in the cover 11 by, for example, bonding. The cover 11 is made of metal in the foregoing embodiment, but does not have to be made of metal. To reduce the weight of the wheel speed sensor 1, the cover 11 may be made of resin.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotation detecting device comprising:
   a sensor body including a molded IC and a holder member, said molded IC having a sensing element for detecting the rotation of a detection object, said holder member holding said molded IC, wherein
   said molded IC has a detection surface opposed to said detection object in order to detect the rotation of said detection object, said holder member located below said detection surface toward said detection object, and said holder member fixes said molded IC by a portion different from said detection surface in the state of exposing said detection surface to the detection object, said molded IC is press-fitted into said holder member.

2. The rotation detecting device according to claim 1, wherein said sensor body has a connector member for electrically connecting said molded IC to the outside, and said sensor body with said holder member and said connector member is integrally formed in a single resin molding process.

3. The rotation detecting device according to claim 2, wherein said sensor body has a terminal disposed over said connector member and said molded IC, said terminal being fixed inside of said sensor body, and said terminal is disposed in such a manner that a connection part of said terminal to be connected to a lead of said molded IC is made connectable to said lead.

4. The rotation detecting device according to claim 3, wherein said sensor body has a plurality of said terminals, and said sensor body is provided with an anti-short wall, said anti-short wall is disposed between said adjacent terminals in an area where said terminals are exposed from said sensor body.

5. A rotation detecting device comprising:

a sensor body including a molded IC and a holder member, said molded IC having a sensing element for detecting the rotation of a detection object, said holder member holding said molded IC, wherein said molded IC has a detection surface opposed to said detection object in order to detect the rotation of said detection object, said holder member located below said detection surface toward said detection object, and said holder member fixes said molded IC by a portion different from said detection surface in the state of exposing said detection surface, said molded IC has a back surface positioned opposite to said detection surface, and two side surfaces adjacent to said detection surface and said back surface, said holder member having a recessed portion with a bottom portion and sidewalls, said molded IC is disposed so that said back surface is opposed to said bottom portion of said holder member, and said molded IC is press-fitted into said holder member, said side surfaces serving as portions to be press-fitted, and said sidewalls of said holder member serving as portions to press-fit.

6. The rotation detecting device according to claim 5, wherein said side surface of said molded IC has a tapered portion, a distance between said two side surfaces increasing with approaching said back surface from said detection surface in said tapered portion, said sidewall of said holder member having a protruding portion in an area opposed to said tapered portion, said protruding portion protruding toward said molded IC, and said molded IC is press-fitted into said holder member, said tapered portion serving as a portion to be press-fitted, and said protruding portion of said holder member serving as a portion to press-fit.

7. The rotation detecting device according to claim 6, wherein said molded IC is press-fitted into said holder member by being inserted into said holder member in a direction parallel to said detection surface as an insertion direction, and said protruding portion is formed in a part of said holder member, except for the vicinity of an entrance for inserting said molded IC.

8. A rotation detecting device comprising:

a sensor body including a molded IC and a holder member, said molded IC having a sensing element for detecting the rotation of a detection object, said holder member holding said molded IC, wherein said molded IC has a detection surface opposed to said detection object in order to detect the rotation of said detection object, said holder member located below said detection surface toward said detection object, and said holder member fixes said molded IC by a portion different from said detection surface in the state of exposing said detection surface, said sensor body is contained in a cover, said cover taking a shape of a lid having a cylindrical side face and a bottom face positioned on an end of said side face, said sensor body has an approximately round-shaped portion integrally continuous from said sensor body, a surface of said approximately round-shaped portion parallel to said bottom face of said cover having an arc-shaped portions a diameter of which is the same as an internal diameter of said cover, said holder member being disposed on the outer periphery of said approximately round-shaped portion, said lead of said molded IC fixed on said holder member being disposed around the center of said approximately round-shaped portion, and said approximately round-shaped portion opens in an area opposite to said molded IC with respect to a connection part between said lead and said terminal, and opens in areas adjacent to said connection part in both right and left directions.

* * * * *